(12) United States Patent
Duncan (10) Patent No.: US 11,746,013 B2
(45) Date of Patent: Sep. 5, 2023

(54) APPARATUS AND METHOD FOR SEPARATING LIQUID OXYGEN FROM LIQUIFIED AIR

(71) Applicant: Texas Tech University System, Lubbock, TX (US)

(72) Inventor: Robert V. Duncan, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 839 days.

(21) Appl. No.: 16/313,336

(22) PCT Filed: Jun. 27, 2017

(86) PCT No.: PCT/US2017/039564
§ 371 (c)(1),
(2) Date: Dec. 26, 2018

(87) PCT Pub. No.: WO2018/005540
PCT Pub. Date: Jan. 4, 2018

(65) Prior Publication Data
US 2019/0169026 A1   Jun. 6, 2019

Related U.S. Application Data

(60) Provisional application No. 62/355,130, filed on Jun. 27, 2016.

(51) Int. Cl.
*F25J 3/02* (2006.01)
*C01B 13/02* (2006.01)
(Continued)

(52) U.S. Cl.
CPC ...... *C01B 13/0248* (2013.01); *B01D 17/0214* (2013.01); *B01D 19/00* (2013.01); *F17C 5/02* (2013.01); *F25J 3/04636* (2013.01)

(58) Field of Classification Search
CPC  C01B 3/0248; C01B 13/0248; F25J 3/04636; F25J 2205/06; F25J 2205/86; F17C 5/02
See application file for complete search history.

(56) References Cited

U.S. PATENT DOCUMENTS 4,867,772 A  *  9/1989  Eyre ............... F25J 3/0426
                                                62/656
2003/0076100 A1*  4/2003  Hasegawa .......... G01R 33/385
                                                324/318
(Continued)

FOREIGN PATENT DOCUMENTS

FR      2935472 A1 *  3/2010  ........ F25J 3/04896
JP      S63264155 A  * 11/1988

OTHER PUBLICATIONS

FR2935472 Translation.*
JPS63264155A Translation.*

*Primary Examiner* — Brian M King
(74) *Attorney, Agent, or Firm* — Dickinson Wright PLLC; Ross Spencer Garsson (57) ABSTRACT

An apparatus and method of separation of LOX and other commercially valuable components, such as LAr from liquefied air, which consists primarily of LN2. Strong magnetic field gradient and gravity are used to separate LOX from liquefied air, based upon the different magnetic properties of LOX and LN2. The apparatus and method employ a magnetic field gradient to levitate the LN2 and LAr diamagnetic components of liquid air while accelerating the paramagnetic LOX component toward the bottom to achieve oxygen separation. In other embodiments, a leak valve system can be used.

11 Claims, 4 Drawing Sheets

(51) Int. Cl.
    *F17C 5/02*    (2006.01)
    *B01D 17/02*   (2006.01)
    *B01D 19/00*   (2006.01)
    *F25J 3/04*    (2006.01)

(56) References Cited

U.S. PATENT DOCUMENTS

2012/0216520 A1* 8/2012 Chen .................. F25J 1/0045
                                                    60/412
2015/0011865 A1* 1/2015 Goldhaber ............ A61B 6/037
                                                   600/411

* cited by examiner

APPARATUS AND METHOD FOR SEPARATING LIQUID OXYGEN FROM LIQUIFIED AIR

CROSS-REFERENCE TO RELATED PATENT APPLICATIONS

This application is a U.S.C. § 371 national application of International PCT Application No. PCT/US17/39564, filed on Jun. 27, 2017, entitled "Apparatus And Method For Separating Liquid Oxygen From Liquified Air", which designated the United States, and which claims priority to U.S. Patent Appl. Ser. No. 62/355,130, filed Jun. 27, 2016, entitled "Apparatus And Method For Separating Liquid Oxygen From Liquified Air." The foregoing patent applications are hereby incorporated herein by reference in their entirety for all purposes.

FIELD OF INVENTION

The present disclosure relates generally to devices and methods for separating liquid oxygen and other gas condensates.

BACKGROUND OF INVENTION

In commerce, liquid oxygen ("LOX") is classified as an industrial gas and is widely used for industrial and medical purposes. Generally, LOX is obtained from the oxygen found naturally in air by fractional distillation in a cryogenic air separation plant.

LOX is a common cryogenic liquid oxidizer propellant for spacecraft rocket applications, usually in combination with liquid hydrogen, kerosene or methane. LOX is useful in this role because it creates a high specific impulse. LOX was used in the very first rocket applications like the V2 missile (under the name A-Stoff and Sauerstoff) and Redstone, R-7 Semyorka, Atlas boosters, and the ascent stages of the Apollo Saturn rockets. LOX was also used in some early ICBMs, although more modern ICBMs do not use LOX because its cryogenic properties and need for regular replenishment to replace boiloff make it harder to maintain and launch quickly. Many modern rockets use liquid oxygen, including the main engines on the now-retired Space Shuttle.

LOX also had extensive use in making oxyliquit explosives, but is rarely used now due to a high rate of accidents.

It is also used in the activated sludge process in waste water treatment to maintain a high level of micro-organisms.

LOX has a pale blue color and is strongly paramagnetic. It is known that LOX can be suspended between the poles of a powerful horseshoe magnet. LOX has a density of 1.141 g/cm$^3$ (1.141 kg/L or 1141 kg/m$^3$) and is cryogenic with a freezing point of 54.36 K and a boiling point of 90.19 K at 101.325 kPa. Liquid oxygen has an expansion ratio of 1:861 under 1 standard atmosphere and 20° C. Because of this, LOX is used in some commercial and military aircraft as transportable source of breathing oxygen.

Because of the cryogenic nature of LOX, LOX can cause the materials it touches to become extremely brittle. Liquid oxygen is also a very powerful oxidizing agent: organic materials will burn rapidly and energetically in LOX. Further, if soaked in LOX, some materials such as coal briquettes, carbon black, etc., can detonate unpredictably from sources of ignition such as flames, sparks or impact from light blows. Petrochemicals, including asphalt, often exhibit this behavior.

Liquid nitrogen ("LN2") is nitrogen in a liquid state at an extremely low temperature. It is produced industrially by fractional distillation of liquid air. LN2 is a colorless clear liquid with density of 0.807 g/ml at its boiling point and a dielectric constant of 1.43. LN2 is a diatomic liquid meaning the diatomic character of the covalent N bonding in N$_2$ gas is retained even after liquefaction.

Liquid nitrogen ("LN2") has a lower boiling point than LOX, and vessels containing LN2 can condense oxygen from air. When most of the nitrogen has evaporated from such a vessel, there is a risk that liquid oxygen remaining can react violently with organic material. Conversely, LN2 or liquid air can be oxygen-enriched by letting it stand in open air; atmospheric oxygen dissolves in it, while nitrogen evaporates preferentially.

At atmospheric pressure, LN2 boils at 77 K and is a cryogenic fluid that can cause rapid freezing on contact with living tissue. When appropriately insulated from ambient heat, LN2 can be stored and transported, for example in vacuum flasks. Here, the very low temperature is held constant at 77 K by slow boiling of the LN2, resulting in the evolution of nitrogen gas. The development of pressurized super-insulated vacuum vessels has enabled LN2 to be stored and transported over longer time periods with losses reduced to 2% per day or less.

LN2 can easily be converted to a solid by placing it in a vacuum chamber pumped by a rotary vacuum pump. LN2 freezes under its vapor pressure at 63 K. LN2 is a compact and readily transported source of nitrogen gas, as it does not require pressurization. Further, its ability to maintain temperatures far below the freezing point of water makes it extremely useful in a wide range of applications, primarily as an open-cycle refrigerant, including (a) in cryotherapy for removing unsightly or potentially malignant skin lesions such as warts and actinic keratosis; (b) to store cells at low temperature for laboratory work; (c) in cryogenics; (d) in a Cryophorus to demonstrate rapid freezing by evaporation; (e) as a backup nitrogen source in hypoxic air fire prevention systems; (f) as a source of very dry nitrogen gas; (g) for the immersion, freezing, and transportation of food products; (h) for the cryopreservation of blood, reproductive cells (sperm and egg), and other biological samples and materials to preserve tissue samples from surgical excisions for future studies; (i) as a method of freezing water and oil pipes in order to work on them in situations where a valve is not available to block fluid flow to the work area, method known as a cryogenic isolation (frequently used in industry and New York district steam pipework and also electrical heat pumps are now often used for small pipe diameters); (j) in the process of promession; (k) for cryonic preservation in hopes of future reanimation; (l) to shrink-weld machinery parts together; (m) as a coolant; (n) in food preparation, such as for making ultra-smooth ice cream; (o) in container inerting and pressurization by injecting a controlled amount of liquid nitrogen just prior to sealing or capping; (p) as a cosmetic novelty giving a smoky, bubbling "cauldron effect" to drinks; (q), as an energy storage medium; as a method of demonstrating the Leidenfrost effect (see https://en.wikipedia.org/wiki/Leidenfrost_effect); dust collection from surfaces; and (r) branding cattle.

Uses as a coolant include: (a) for CCD cameras in astronomy; (b) for a high-temperature superconductor to a temperature sufficient to achieve superconductivity; (c) for vacuum pump traps and in controlled-evaporation processes in chemistry; (d) to increase the sensitivity of infrared homing seeker heads of missiles; (e) to temporarily shrink mechanical components during machine assembly and allow improved interference fits; (f) for computers and extreme overclocking; and (g) for simulation of space background in vacuum chamber during spacecraft thermal testing.

The culinary use of LN2 is employed by restaurants in the preparation of frozen desserts (such as ice cream) which can be created within moments at the table because of the speed at which it cools food. The rapidity of chilling also leads to the formation of smaller ice crystals, which provides the dessert with a smoother texture. LN2 has also become popular in the preparation of cocktails because it can be used to quickly chill glasses or freeze ingredients. It is also added to drinks to create a smoky effect, which occurs as tiny droplets of the LN2 come into contact with the surrounding air, condensing the vapor that is naturally present.

Generally, LN2 is produced commercially from the cryogenic distillation of liquefied air or from the liquefaction of pure nitrogen derived from air using pressure swing adsorption. An air compressor is used to compress filtered air to high pressure; the high-pressure gas is cooled back to ambient temperature, and allowed to expand to a low pressure. The expanding air cools greatly (the Joule-Thomson effect), and oxygen, nitrogen, and argon are separated by further stages of expansion and distillation. Small-scale production of LN2 is easily achieved using this principle. LN2 may be produced for direct sale, or as a byproduct of manufacture of liquid oxygen used for industrial processes such as steelmaking, rocketry, and medicine, to name just a few.

LOX has a high market value, particularly LOX that is ultra-pure. Generally, the purity of LOX is typically between 95 and 97% by mole oxygen. Ultra-pure LOX (at least about 98% by mole) provides superior uses for the LOX. See U.S. Patent Appl. Publ. No 2014/0053601, entitled "Method and Apparatus for Separating Air by Cryogenic Distillation, to Davidian et al., published Feb. 28, 2014 ("Davidian '601 Application"). The Davidian '601 Application discloses a method for separating air, in which a flow of oxygen-rich liquid is sent to a top of a pure oxygen column, having a pure oxygen reboiler, in which said flow is purified in order to form a vessel liquid containing at least 98 mol % of oxygen and the vessel liquid is drawn off as a product.

Separation of LOX and LN2 from liquid air is mainly by gravity separation of those respective liquids. The LOX is more dense than LN2, so LOX settles to the bottom of the separation unit. However, LOX is miscible in LN2 so other techniques involving selected evaporation are utilized as well.

In view of the explosion hazard of LOX, there is a need for an improved method to remove LOX from liquid air. There is also a need for more economically, efficient, and scalable processes to separate LOX from liquid air, particularly for processes that yield ultra-pure LOX.

SUMMARY OF INVENTION

The present invention is a process method in which ultra-pure LOX may be recovered from liquid air, and therefore, there is no need for the step of evaporating the liquid air mixture to recover the oxygen (and thus this step can be eliminated from the recovery process). In embodiments of the present invention, the invention utilizes a strong magnetic field and gravity to separate the LOX from the liquefied air, and is based upon the different magnetic properties of LOX and LN2. The system can selectively magnetically levitate select materials in the liquid air (i.e., the LN2 and liquid argon). In other embodiments of the present invention, the invention utilizes a leak valve (permanently set or adjustable by one or more actuators) and gravity to separate the LOX from the liquefied air. In further embodiments, the invention can utilize the magnetic field, leak valve, and gravity in combination. alternatively, or in addition to, the leak valve. This may be used to achieve ultra-pure LOX in concert with gravimetric process which otherwise would achieve a lower purity.

The present invention is a device and a method of separation of LOX and other commercially valuable components such as liquid argon ("LAr") from liquefied air, which consists primarily (79% by volume) of LN2. Strong magnetic field gradient and gravity are used to separate LOX from liquefied air, based upon the different magnetic properties of LOX and LN2. The disclosed invention employs a magnetic field gradient to levitate the LN2 and LAr diamagnetic components of liquid air while accelerating the paramagnetic LOX component toward the bottom, thus achieving oxygen separation.

Such invention can extract ultra-pure LOX (greater than 98% by weight), and, in some embodiments greater than 99.5% by weight. Such invention also eliminates the need to evaporate the liquefied air mixture to recover the LOX.

In general, in one aspect, the invention features An apparatus for separating liquid oxygen from liquid air. The apparatus includes a liquid air storage container. The apparatus further includes a separation system that is selected from a group consisting of (i) a magnetic field system, (ii) leak valve system, and (iii) a combination thereof. The separation system is operatively connected to the liquid air storage container. The separation system is operable to separate liquid oxygen from liquid air from the storage container. The apparatus further includes a second container. The second container is operatively connected to the separation system. The second container is operative to collect liquid oxygen separated from the liquid air by the separation system.

Implementations of the invention can include one or more of the following features:

The liquid air storage container can contain liquid air. The liquid air storage container can include a bottom section that has a portion of the liquid air that is rich in liquid oxygen due to gravity. The liquid air storage container can include a top section that has air vapor. The apparatus can further include a first conduit. The first conduit can be operatively connected to (i) the bottom section of the liquid air storage container and (ii) the separation system, to provide for the liquid air that is rich in liquid oxygen to flow from the liquid air storage container, through the first conduit, and to the separation system. The apparatus can further include a second conduit. The second conduit can be operatively connected to (i) the separation system and (ii) the second container, to provide for the liquid oxygen separated by the separation system to flow from the separation system, through the conduit, and to the second container. The second storage container can contain liquid oxygen.

The liquid oxygen can be collected in the second storage container via gravity.

The separation system can include the magnetic field system.

The magnetic field system can be operable to levitate liquid oxygen from the liquid air based upon the different magnetic properties of liquid oxygen and liquid nitrogen.

The magnetic field can have a field and gradient that is between about 105% and about 140% of the requirement to levitate liquid oxygen.

The magnetic field system can include an acceleration magnet.

The acceleration magnet can include a gradient coil.

The gradient coil can have an adjustable strength.

The acceleration magnet can further include a high field coil and a high-field sim coil.

The gradient coil can be wound to achieve a field and gradient that is between about 105% and about 140% of the requirement to levitate liquid oxygen.

The gradient coil can be wound to achieve a field and gradient that is between about 8.5 $T^2/m$ and about 11.5 $T^2/m$.

The high field coil can be wound to produce between about 105% and about 140% of the maximum field on the gradient coil.

The separation system can include the leak valve system.

The leak valve system can include one or more adjustable controllers and sensors that are operable to separate liquid oxygen from the liquid air.

The apparatus can be capable of collecting ultra-pure liquid oxygen in the second container.

The ultra-pure liquid oxygen can be at least about 98% liquid oxygen by weight.

The ultra-pure liquid oxygen can be at least about 99.5% liquid oxygen by weight.

The ultra-pure liquid oxygen can be at least about 98% liquid oxygen by mole.

In general, in another aspect, the invention features a method of separating liquid oxygen from liquid air. The method includes the step of storing liquid air in a liquid air storage container. The liquid storage container includes a bottom section that has a portion of the liquid air that is rich in liquid oxygen due to gravity. The liquid storage container further includes a top portion that has air vapor. The method further includes flowing liquid air from the bottom section to a separation system. The separation system is selected from a group consisting of (i) a magnetic field system, (ii) leak valve system, and (iii) a combination thereof. The method further includes utilizing the separation system to separate liquid oxygen from the liquid air that is rich in liquid oxygen. The method further includes collecting the liquid oxygen in a second storage container.

Implementations of the invention can include one or more of the following features:

The liquid oxygen can be collected in the second storage container via gravity.

The separation system can include the magnetic field.

The step of utilizing the separation system can include utilizing the magnetic field to levitate liquid oxygen from the liquid air based upon the different magnetic properties of liquid oxygen and liquid nitrogen.

The step of utilizing the separation system can include utilizing an acceleration magnet.

The acceleration magnet can include a gradient coil.

The step of utilizing the acceleration magnet can include adjusting the strength of the gradient coil.

The acceleration magnet can further include a high field coil and a high-field sim coil.

The gradient coil can be wound to achieve a field and gradient that is between about 105% and about 140% of the requirement to levitate liquid oxygen.

The gradient coil can be wound to achieve a field and gradient that is between about 8.5 $T^2/m$ and about 11.5 $T^2/m$.

The high field coil can be wound to produce between about 105% and about 140% of the maximum field on the gradient coil.

The separation system can include the leak valve system.

The step of utilizing the separation system can include utilizing the leak valve system using one or more adjustable controllers and sensors to separate liquid oxygen from the liquid air.

The step of collecting liquid oxygen in the second storage container can include collecting ultra-pure liquid oxygen in the second container.

The ultra-pure liquid oxygen can be at least about 98% liquid oxygen by weight.

The ultra-pure liquid oxygen can be at least about 99.5% liquid oxygen by weight.

The ultra-pure liquid oxygen can be at least about 98% liquid oxygen by mole.

The method can include using an above-described apparatus for separating liquid oxygen from liquid air.

In general, in another aspect, the invention features an apparatus for separating liquid oxygen from liquid air. The apparatus includes a liquid storage container. The apparatus further includes a magnetic field system operable to separate liquid oxygen from liquid air, based upon the different magnetic properties of liquid oxygen and liquid nitrogen. The employment of the magnetic field gradient is operable to levitate the liquid nitrogen in the liquid air while the liquid oxygen is directed in a different direction to achieve liquid oxygen separation. The apparatus further includes a second storage container to store the liquid oxygen separated by the magnetic field system.

Implementations of the invention can include one or more of the following features:

The different direction can be a downward direction.

The apparatus can further include a leak valve system operable to separate the liquid oxygen from the liquid air.

The ultra-pure liquid oxygen can be at least about 98% liquid oxygen by weight.

The ultra-pure liquid oxygen can be at least about 99.5% liquid oxygen by weight.

The ultra-pure liquid oxygen can be at least about 98% liquid oxygen by mole.

In general, in another aspect, the invention features a method of separating liquid oxygen from liquid air. The method includes the step of employing a magnetic field gradient and gravity to separate liquid oxygen from liquid air, based upon the different magnetic properties of liquid oxygen and liquid nitrogen. The employment of the magnetic field gradient levitates the liquid nitrogen in the liquid air while the liquid oxygen is directed in a different direction to achieve liquid oxygen separation. The method further includes the step of collecting the liquid oxygen separated from the liquid air.

Implementations of the invention can include one or more of the following features:

The different direction can be a downward direction.

The apparatus can further include a leak valve system operable to separate the liquid oxygen from the liquid air.

The ultra-pure liquid oxygen can be at least about 98% liquid oxygen by weight.

The ultra-pure liquid oxygen can be at least about 99.5% liquid oxygen by weight.

The ultra-pure liquid oxygen can be at least about 98% liquid oxygen by mole.

BRIEF DESCRIPTION OF THE DRAWINGS

For better understanding of the present invention, and the advantages thereof, reference is now made to the following descriptions taken in conjunction with the accompanying drawings.

DETAILED DESCRIPTION

The present disclosure relates generally to devices and methods for separating liquid oxygen and other gas condensates.

System Having a Magnetic Field

Figure 1A:
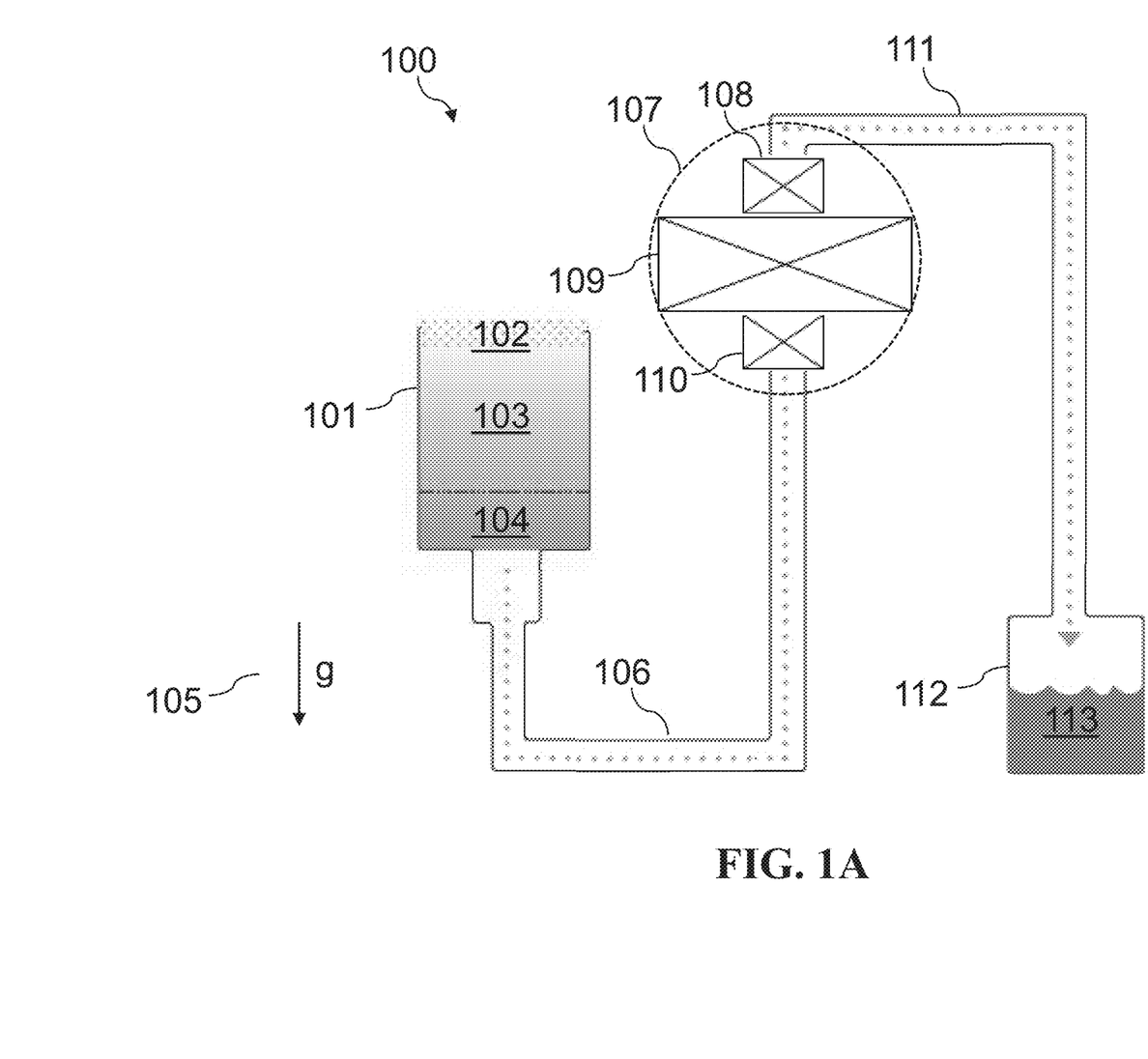
FIG. 1A illustrates a system of the present invention that utilizes an accelerator magnet.

Referring to FIG. 1A, FIG. 1A illustrates a system 100 that can be used to separate liquid oxygen from liquid air. Liquid air 103 is stored in liquid air storage container 101. Air vapor 102 is located at the top of container 101. The bottom of container 101 has a liquid that is rich in liquid oxygen (LOX-rich liquid 104) due to gravity. (As shown in downward arrow 105, gravity is directed downward relative to the orientation of system 100). The LOX-rich liquid flows through conduit 106 to a magnetic field system 107, which generates a magnetic field gradient that will create a field and gradient (B∇B) that will levitate the LOX.

For instance, magnetic field system 107 can be an accelerator magnet that includes a gradient coil 110, a high field coil 109, and a high-field shim coil 108. The gradient coil 110 can be wound to achieve B∇B that is in the range between around 105% and around 140% (such as around 120%) of the requirement to levitate the LOX. As discussed below, this has been determined to be in the range between around 8.5 and around 11.5 10 $T^2/m$ (such as around 10 $T^2/m$). The high field coil 109 is wound to produce around 105% to around 140% (such as around 120%) of the maximum field on gradient coil 110. The high-field shim coil is wound to fine tune the gradient field right before the bending to conduit 111 (which is, as shown in FIG. 1A is horizontal). The liquid oxygen is then collected through conduit 111 to LOX storage container 112 (which contains LOX 113).

In alternative embodiments, the accelerator magnet can include only gradient coil 110 with adjustable strength to obviate the need for high field coil 109 and a high-field shim coil 108.

Magnetic Levitation

As noted above, a B∇B that is in the range between around 105% and around 140% (such as around 120%) has been found to be the requirement to levitate the LOX. Calculation of this was shown as follows. The magneto-mechanical force ($F_m$) is set forth by the equation:

$$F_m = m\nabla B = \frac{1}{2}(\chi/\mu_0)V\nabla B^2 \quad (1)$$

where,
 m is the magnetic moment;
 $\chi$ is the (tensorial) magnetic susceptibility;
 $\mu_0$ is the permeability of free space;
 V is the volume; and
 B is the magnetic flux density.

The gravitation force ($F_g$) is set forth by the equation:

$$F_g = \rho V g \quad (2)$$

where,
 $\rho$ is the density;
 g is gravity.

A metastable equilibrium, or levitation, can be created for $F_m - F_g = 0$ by proper orientation of the B-vector and proper choice of the magnitude of the gradient $\nabla B^2$. See Hagen, W. R., "Biological Systems In High Magnetic Field," *High Magnetic Field: Science and Technology*, Vol. 3, 210 (2006) ("Hagen").

Setting equations (1) and (2) equal to each other yields:

$$\frac{1}{2}(\chi/\mu_0)V\nabla B^2 = \rho V g \quad (3)$$

This equation simplifies to:

$$\nabla B^2 = 2\rho g \mu_0/\chi \quad (4)$$

Utilizing equation (4), this calculates that for LOX, $\nabla B^2_{LOX}$ is around 8.1 $T^2/m$. This is a very modest field in comparison with LN2, in which $\nabla B^2_{LN2}$ is around $-2500$ $T^2/m$.

Magnetic Field

For LOX, for levitation, $\nabla B^2 \geq 8.1$ $T^2/m$. In embodiments of the invention for LOX separation, the field can be set as follows:

$$B = k\mu_0 nI \quad (5)$$

where
 k is the relative permeability;
 n is the turns/m; and
 I is the current.

Turning to $k\mu_0$:

$$k\mu_0 = \mu \quad (6)$$

$$\mu/\mu_0 = 1 + \chi \quad (7)$$

Since $\chi$ for LOX is $3.5 \times 10^{-3}$, the paramagnetic moment of LOX makes only a small correction (<1%) of the field calculations, and this can ignored for levitation purposes. For equation (5) this yields:

$$B = \mu_0 nI \quad (8)$$

$$\nabla B = \mu_0 \nabla n \quad (9)$$

Using equations (8) and (9), this yields for B∇B:

$$B\nabla B = \mu_0^2 I^2 (n\nabla n) \quad (10)$$

Conventionally and often, I is utilized at 10 amps. $\mu_0$ is $4\pi \times 10^{-7}$ T/amp/m and a constant of nature. Therefore $\mu_0^2 I^2 = \sim 1.58 \times 10^{-10}$ $T^2/m^2$ for 10 amps. So for 10 amps, to levitate LOX (utilizing equation (10)):

$$B\nabla B = 8.1 \text{ } T^2/m = 1.58 \times 10^{-10} \text{ } T^2/m^2 (n\nabla n) \quad (11)$$

Solving equation (11) for $n\nabla n$, $$(n\nabla n) = 5.1 \times 10^{10} (\text{turns})^2/m^3 \quad (12)$$

So with $n = 10^3$ turns/m, equation (12) yields:

$$\nabla n = 5.1 \times 10^7 \text{ turns}/m^2 = 5.1 \times 10^3 \text{ turns/cm per cm} \quad (13)$$

This process of determining $\nabla n$ and designing the coils (such as turns per cm) can be used when setting the field in embodiments of the present invention. As noted above, for LOX, the apparatus of the present invention generally utilizes B∇B that in the range between around 105% and around 140% (such as around 120%) of the requirement to levitate the LOX. Note here that I=10 A is an arbitrary example above. This current may be readily increased to higher values, such as 100 A or even 1000 A in order to reduce the size of the required product of n n.

Figure 1B:
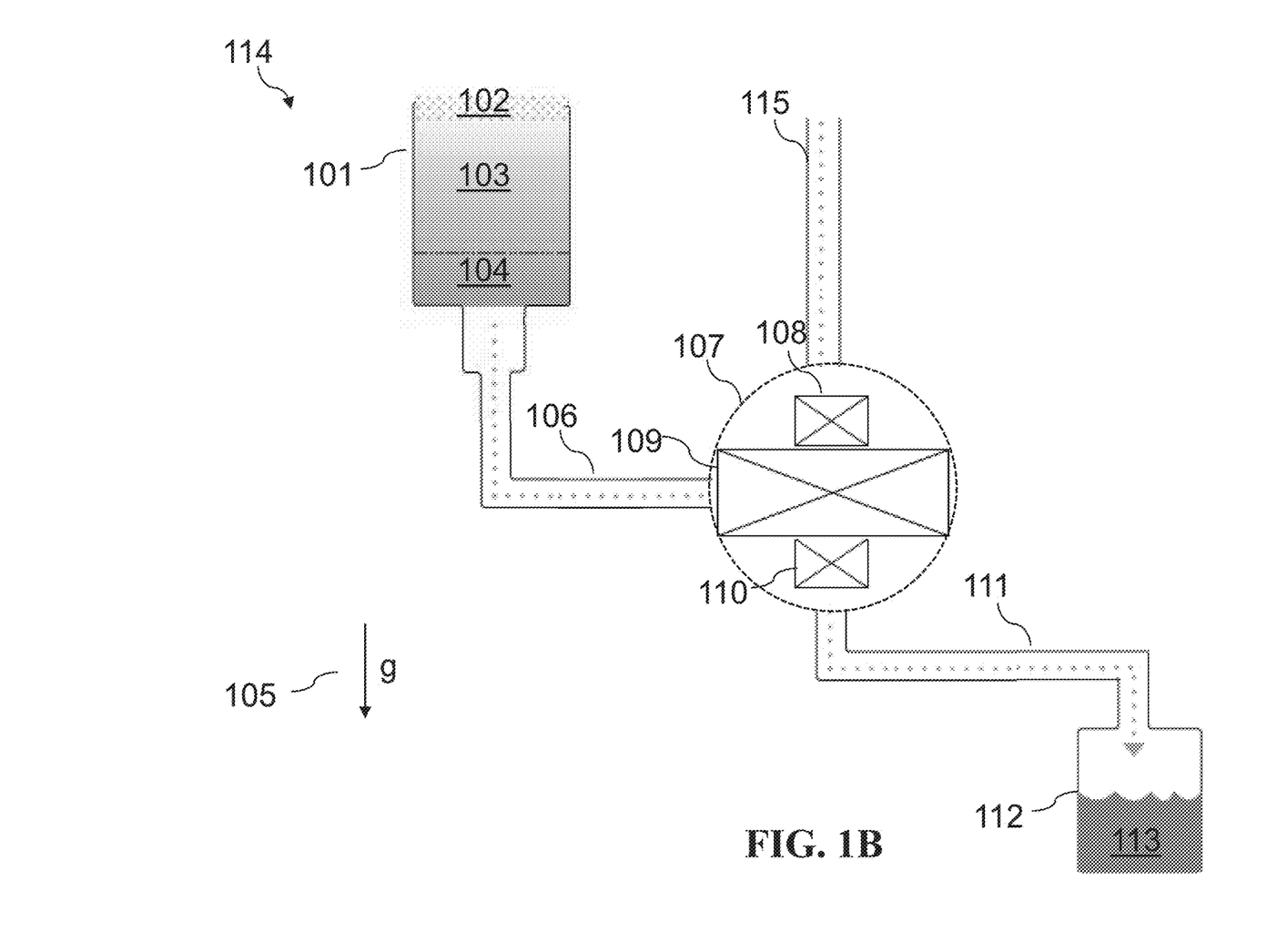
FIG. 1B illustrates an alternative system of the present invention that utilizes an accelerator magnet.

FIG. 1B illustrates an alternative system 114 that can be used to separate liquid oxygen from liquid air. This includes many of the same features as systems 100. In FIG. 1B, conduit 106 flows the LOX-rich fluid to the magnetic system 107 and utilizes the magnetic field system 107 to employ a magnetic field gradient to levitate the LN2 and LAr diamagnetic components of liquid air in conduit 115 (for collection if so desired) while directing the paramagnetic LOX component toward the bottom (in conduit 111) to achieve oxygen separation.

System Having a Leak Valve

Figure 2:
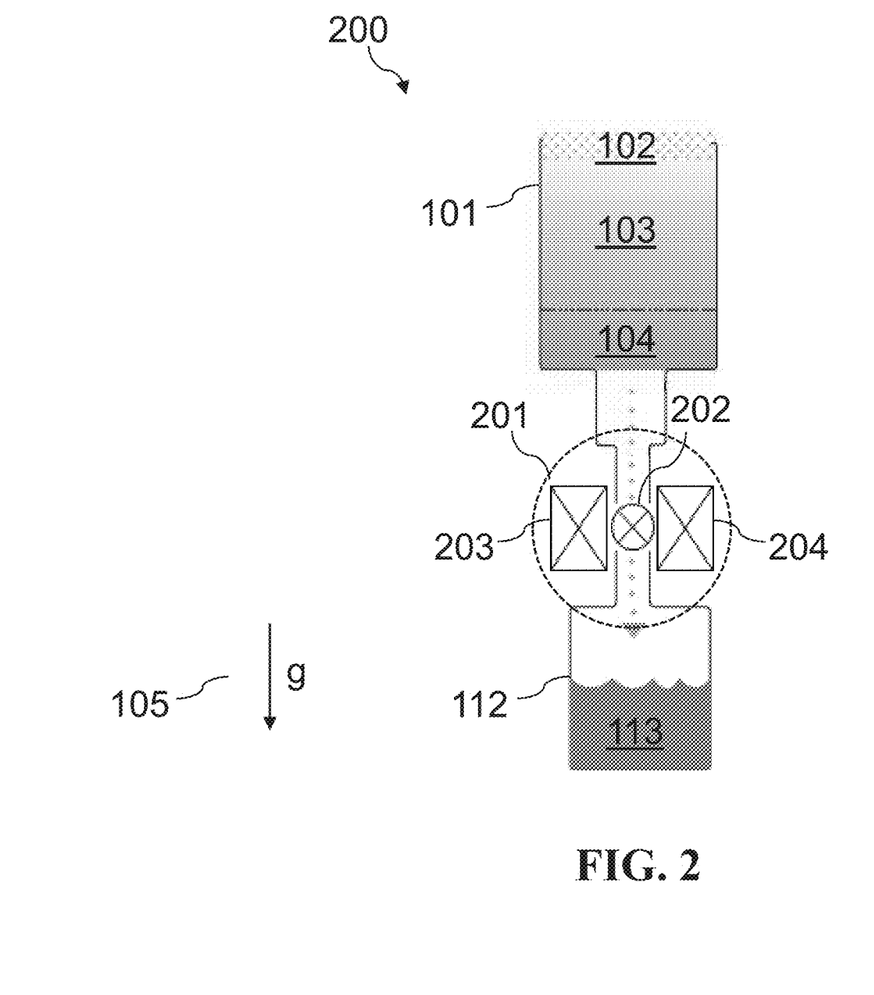
FIG. 2 illustrates another system of the present invention that utilizes a leak valve.

An alternative embodiment of the present invention can utilize a leak valve (either adjustable or permanent), as shown in FIG. 2. FIG. 2 illustrates a system 200 that can also be used to separate liquid oxygen from liquid air. As with system 100, liquid air 103 is stored in liquid air storage container 101. Air vapor 102 is located at the top of container 101. The bottom of container 101 has LOX-rich liquid 104. The LOX-rich liquid flows through leak valve system 201, which includes a leak valve 202 that is adjustable by controllers/sensors 203-204. The liquid oxygen is then collected (via gravity) to LOX storage container 112 (which contains LOX 113).

System Having a Magnetic Field and a Leak Valve

Figure 3:
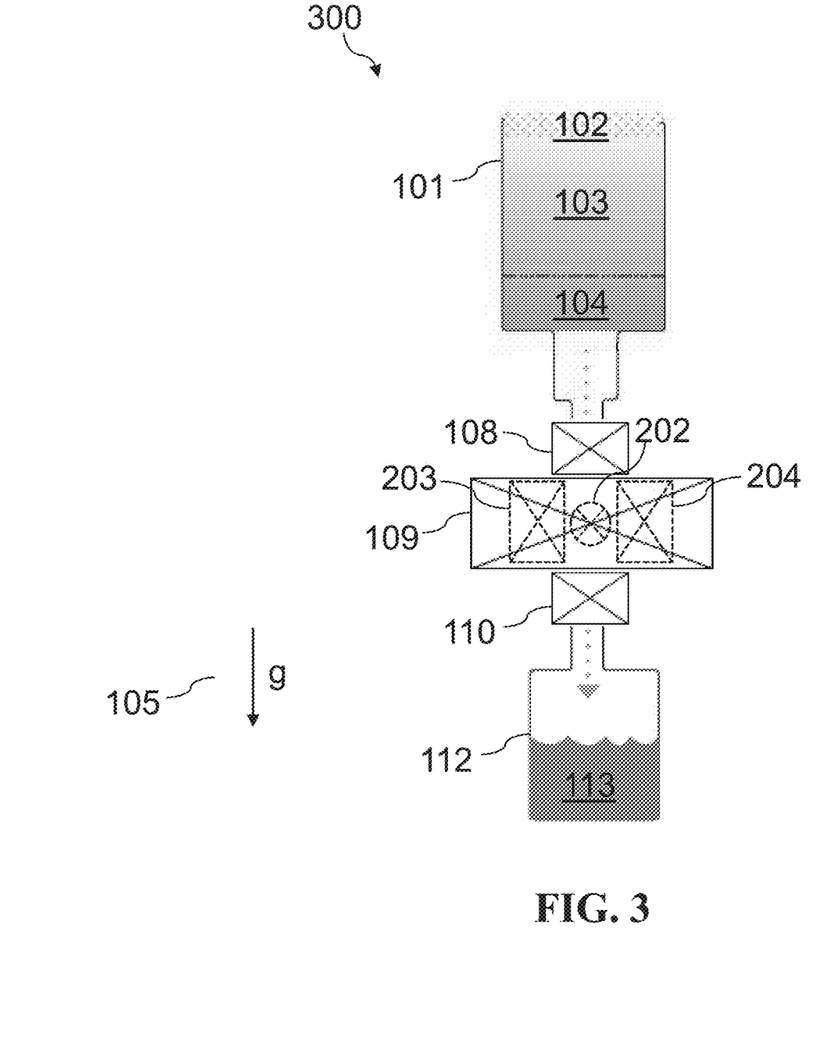
FIG. 3 illustrates another system of the present invention that utilizes an accelerator magnet and leak valve.

A further embodiment of the present invention can utilize both a magnetic field and a leak valve system. FIG. 3 illustrates a system 300 that can also be used to separate liquid oxygen from liquid air that includes a magnetic field system (such as an accelerator magnet that includes a gradient coil 110, a high field coil 109, and a high-field shim coil 108) in combination with a leak valve system (such as leak valve 202 that is adjustable by controllers/sensors 203-204).

The examples provided herein are to more fully illustrate some of the embodiments of the present invention. It should be appreciated by those of skill in the art that the techniques disclosed in the examples which follow represent techniques discovered by the Applicant to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, other embodiments are within the scope of the following claims. The scope of protection is not limited by the description set out above.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

RELATED PATENTS AND PUBLICATIONS

The following patents and publications relate to the present invention:

U.S. Pat. No. 4,547,277, entitled "Oxygen separator," to Lawless, issued Oct. 15, 1985.

U.S. Pat. No. 4,433,989, entitled "Air separation with medium pressure enrichment," to Erickson, issued Feb. 28, 1984.

China Patent No. 101033909A, filed Apr. 11, 2007.

The disclosures of all patents, patent applications, and publications cited herein are hereby incorporated herein by reference in their entirety, to the extent that they provide exemplary, procedural, or other details supplementary to those set forth herein.

What is claimed is:

1. A method of separating liquid oxygen from liquid air comprising:
    (a) storing liquid air in a liquid air storage container, wherein the liquid storage container comprises
        (i) a bottom section that has a portion of the liquid air that is rich in liquid oxygen due to gravity, and
        (ii) a top portion that has air vapor;
    (b) flowing liquid air from the bottom section to a separation system, wherein the separation system comprises a magnetic field system and a leak valve system;
    (c) utilizing the separation system to separate liquid oxygen from the liquid air that is rich in liquid oxygen; and
    (d) collecting the liquid oxygen in a second storage container.

2. The method of claim 1, wherein the liquid oxygen is collected in the second storage container via gravity.

3. The method of claim 1, wherein the utilizing the separation system comprises utilizing the magnetic field to levitate liquid oxygen from the liquid air based upon the different magnetic properties of liquid oxygen and liquid nitrogen.

4. The method of claim 1, wherein the magnet comprises a gradient coil.

5. The method of claim 4, wherein the gradient coil is wound to achieve a field and gradient that is between about 105% and about 140% of the requirement to levitate liquid oxygen.

6. The method of claim 4, wherein the gradient coil is wound to achieve a field and gradient that is between about 8.5 $T^2/m$ and about 11.5 $T^2/m$.

7. The method of claim 1, wherein the utilizing the separation system comprises utilizing the leak valve system using one or more adjustable controllers and sensors to separate liquid oxygen from the liquid air.

8. The method of claim 1, wherein the collecting liquid oxygen in the second storage container comprises collecting ultra-pure liquid oxygen in the second container.

9. The method of claim 8, wherein the ultra-pure liquid oxygen is at least about 98% liquid oxygen by weight.

10. The method of claim 8, wherein the ultra-pure liquid oxygen is at least about 99.5% liquid oxygen by weight.

11. The method of claim 8, wherein the ultra-pure liquid oxygen is at least about 98% liquid oxygen by mole.

\* \* \* \* \*